(12) United States Patent
Bosnyak et al.

(10) Patent No.: US 10,361,450 B2
(45) Date of Patent: Jul. 23, 2019

(54) EXFOLIATED CARBON NANOTUBES, METHODS FOR PRODUCTION THEREOF AND PRODUCTS OBTAINED THEREFROM

(75) Inventors: Clive P. Bosnyak, Dripping Springs, TX (US); Kurt W. Swogger, Austin, TX (US)

(73) Assignee: Designed Nanotubes, LLC, Austin, TX (US)

( * ) Notice: Subject to any disclaimer, the term of this patent is extended or adjusted under 35 U.S.C. 154(b) by 1236 days.

(21) Appl. No.: 13/140,029

(22) PCT Filed: Dec. 18, 2009

(86) PCT No.: PCT/US2009/068781
§ 371 (c)(1),
(2), (4) Date: Aug. 9, 2011

(87) PCT Pub. No.: WO2010/117392
PCT Pub. Date: Oct. 14, 2010

(65) Prior Publication Data
US 2011/0294013 A1 Dec. 1, 2011

Related U.S. Application Data
(60) Provisional application No. 61/139,050, filed on Dec. 19, 2008.

(51) Int. Cl.
*H01M 4/485* (2010.01)
*H01M 10/052* (2010.01)
(Continued)

(52) U.S. Cl.
CPC ............. *H01M 10/052* (2013.01); *B32B 5/02* (2013.01); *B32B 5/24* (2013.01); *B32B 15/04* (2013.01);
(Continued)

(58) Field of Classification Search
CPC . C01B 31/0206–31/022; C01B 32/174; C01B 32/168; H01M 4/625;
(Continued)

(56) References Cited

U.S. PATENT DOCUMENTS

2005/0006623 A1  1/2005  Wong et al.
2005/0106093 A1  5/2005  Iijima et al.
(Continued)

FOREIGN PATENT DOCUMENTS

EP       1665446 B1      3/2012
JP       2006-240901     9/2006
(Continued)

OTHER PUBLICATIONS

Susan Liao, Guofu Xu, Wei Wang, Fumio Watari, Fuzhai Cui, Seeram Ramakrishna, Casey K. Chan, Self-assembly of nano-hydroxyapatite on multi-walled carbon nanotubes, Acta Biomaterialia, vol. 3, Issue 5, 2007, pp. 669-675.*

(Continued)

*Primary Examiner* — Philip A. Stuckey
(74) *Attorney, Agent, or Firm* — Hunton AK, LLP

(57) ABSTRACT

In various embodiments, exfoliated carbon nanotubes are described in the present disclosure. The carbon nanotubes maintain their exfoliated state, even when not dispersed in a medium such as a polymer or a liquid solution. Methods for making the exfoliated carbon nanotubes include suspending carbon nanotubes in a solution containing a nanocrystalline material, precipitating exfoliated carbon nanotubes from the solution and isolating the exfoliated carbon nanotubes. In some embodiments, methods for making exfoliated carbon nanotubes include preparing a solution of carbon nanotubes in an acid and filtering the solution through a filter to collect exfoliated carbon nanotubes on the filter. In other various embodiments, energy storage devices and polymer compos- (Continued)

ites containing exfoliated carbon nanotubes are described herein.

9 Claims, 6 Drawing Sheets

(51) Int. Cl.
| | |
|---|---|
| *B82Y 30/00* | (2011.01) |
| *B82Y 40/00* | (2011.01) |
| *H01G 11/36* | (2013.01) |
| *H01M 4/62* | (2006.01) |
| *B32B 5/02* | (2006.01) |
| *B32B 5/24* | (2006.01) |
| *B32B 15/04* | (2006.01) |
| *B32B 15/20* | (2006.01) |
| *B32B 27/06* | (2006.01) |
| *B32B 27/18* | (2006.01) |
| *B32B 27/32* | (2006.01) |
| *C01B 32/168* | (2017.01) |
| *C01B 32/174* | (2017.01) |
| *H01M 4/13* | (2010.01) |

(52) U.S. Cl.
CPC .............. *B32B 15/20* (2013.01); *B32B 27/06* (2013.01); *B32B 27/18* (2013.01); *B32B 27/32* (2013.01); *B82Y 30/00* (2013.01); *B82Y 40/00* (2013.01); *C01B 32/168* (2017.08); *C01B 32/174* (2017.08); *H01G 11/36* (2013.01); *H01M 4/625* (2013.01); *B32B 2262/101* (2013.01); *B32B 2264/108* (2013.01); *B32B 2307/202* (2013.01); *B32B 2307/204* (2013.01); *B32B 2457/10* (2013.01); *B32B 2457/16* (2013.01); *H01M 4/13* (2013.01); *Y02E 60/13* (2013.01)

(58) Field of Classification Search
CPC ....... H01M 10/052; H01M 4/13; B32B 15/04; B32B 15/20; B32B 5/02; B32B 5/24; B32B 27/06; B32B 27/32; B32B 27/18; B32B 2457/16; B32B 2262/101; B32B 2307/204; B32B 2264/108; B32B 2307/202; B32B 2457/10; B82Y 40/00; B82Y 30/00; H01G 11/36; Y02E 60/13
USPC ...................................... 429/231.1
See application file for complete search history.

(56) References Cited

U.S. PATENT DOCUMENTS

| | | | |
|---|---|---|---|
| 2006/0286456 A1 | 12/2006 | Fu et al. | |
| 2007/0125707 A1 | 6/2007 | Komatsu et al. | |
| 2007/0215841 A1 | 9/2007 | Ford et al. | |
| 2007/0280876 A1* | 12/2007 | Tour et al. | 423/460 |
| 2008/0220148 A1 | 9/2008 | Clarkson et al. | |
| 2008/0290007 A1* | 11/2008 | Fagan et al. | 209/659 |
| 2009/0173918 A1* | 7/2009 | Hersam | B82Y 30/00 252/502 |
| 2009/0311489 A1* | 12/2009 | Sheehan et al. | 428/195.1 |
| 2010/0004468 A1* | 1/2010 | Wong et al. | 549/208 |
| 2010/0072458 A1* | 3/2010 | Green | B03D 3/00 257/24 |
| 2010/0098877 A1* | 4/2010 | Cooper et al. | 427/551 |
| 2011/0311876 A1 | 12/2011 | Sturgeon et al. | |

FOREIGN PATENT DOCUMENTS

| | | |
|---|---|---|
| JP | 2008-098009 A | 4/2008 |
| JP | 2008-531460 A | 8/2008 |
| WO | 2006/096613 | 9/2006 |
| WO | 2008/011623 | 1/2008 |
| WO | 2008/051239 | 5/2008 |
| WO | 2008153609 A1 | 12/2008 |
| WO | 2009/155267 | 12/2009 |
| WO | 2012/083358 | 6/2012 |
| WO | 2013/011516 | 1/2013 |

OTHER PUBLICATIONS

Liu, Yu, et al. "Cation-Controlled Aqueous Dispersions of Alginic-Acid-Wrapped Multi-Walled Carbon Nanotubes." Small 2.7 (2006): 874-878.*
Yu, Junrong, et al. "Controlling the dispersion of multi-wall carbon nanotubes in aqueous surfactant solution." Carbon 45.3 (2007): 618-623.*
Chaturvedi, Poornendu, et al. "Carbon nanotube-Purification and sorting protocols." Defense science journal 58.5 (2008): 591.*
Li, Jun, et al. "Comparison of the electrocatalytic performance of PtRu nanoparticles supported on multi-walled carbon nanotubes with different lengths and diameters." Electrochimica Acta 54.4 (2009): 1277-1285. (Year: 2008).*
Chang, Woo Hyuck, et al. "The dispersion stability of multi-walled carbon nanotubes in the presence of poly (styrene/α-methyl styrene/acrylic acid) random terpolymer." Macromolecular research 14.5 (2006): 545-551. (Year: 2006).*
Chinese Patent Office; Response to Office Action; Chinese Patent Application No. 200980155854.4; dated Dec. 17, 2013, 6 pages.
Japanese Patent Office; Office Action; Japanese Patent Application No. 2011-542495; dated Jan. 14, 2014, 10 pages.
Chinese Patent Office; First Office Action (in Chinese); Chinese Patent Application No. 200980155854.4, 10 pages, dated Aug. 2, 2013.
Chinese Patent Office; Second Office Action; Chinese Patent Application No. 200980155854.4; dated Apr. 30, 2014, 8 pages.
Chinese Patent Office; Second Office Action (English translation of Part II); Chinese Patent Application No. 200980155854.4; dated Apr. 30, 2014, 3 pages.
Japanese Patent Office; Argument and Amendment, including amended claims in English; Japanese Patent Application No. 2011-542495; dated Jul. 14, 2014.
Chinese Patent Office; Observations and Amendments, including amended claims in English, Chinese Patent Application No. 200980155854.4, dated Sep. 15, 2014.
Supplementary European Search Report (EP 09843170), dated Apr. 23, 2015.
Japanese Office Action (JP 2016-023202), dated Jan. 10, 2017.

* cited by examiner

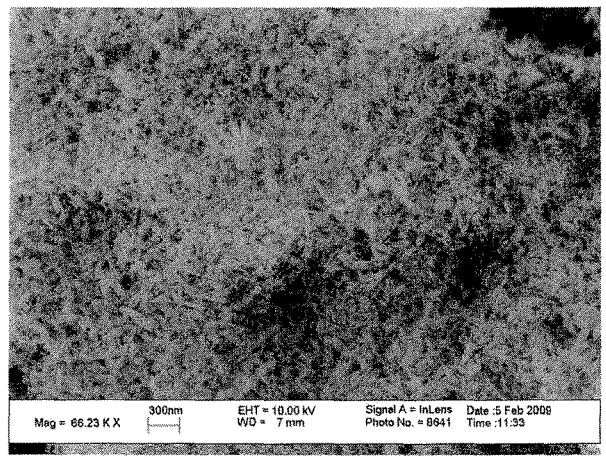
FIGURE 5
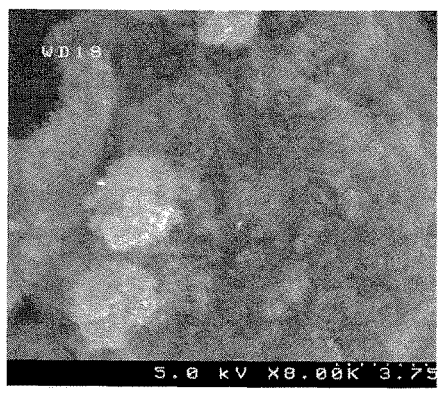
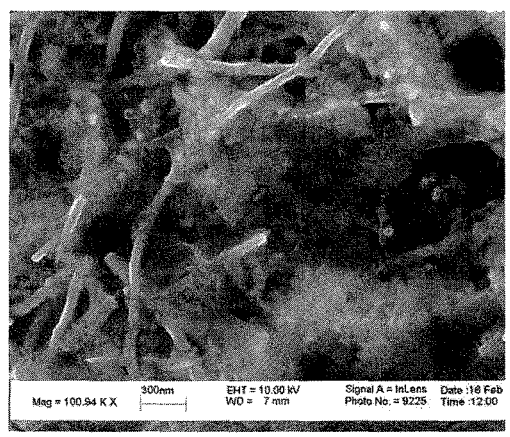
FIGURE 6A
FIGURE 6B

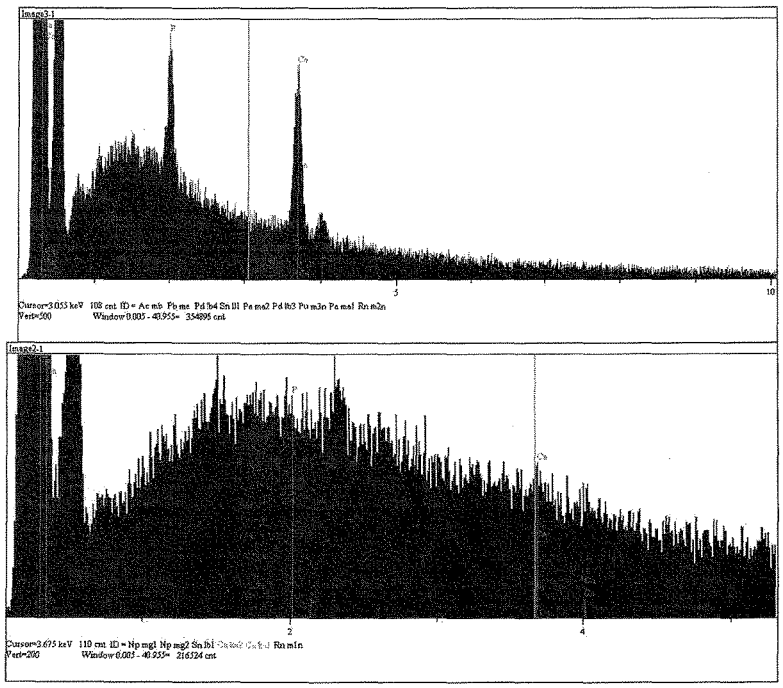
FIGURE 7A
FIGURE 7B
FIGURE 8
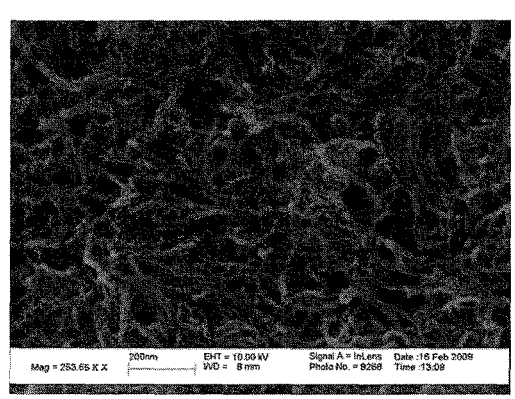

EXFOLIATED CARBON NANOTUBES, METHODS FOR PRODUCTION THEREOF AND PRODUCTS OBTAINED THEREFROM

CROSS REFERENCE TO RELATED APPLICATIONS

This application claims priority to U.S. provisional patent applications 61/138,551, filed Dec. 18, 2008, and 61/139,050, filed Dec. 19, 2008, each of which is incorporated by reference herein in its entirety.

STATEMENT REGARDING FEDERALLY SPONSORED RESEARCH

Not applicable

BACKGROUND

Carbon nanotubes in their solid state are currently produced as agglomerated nanotube bundles in a mixture of chiral forms. Current technologies cannot fully exfoliate bundles of carbon nanotubes to produce individualized carbon nanotubes in the solid state without significant chemical and physical property modifications taking place to the carbon nanotubes. Additionally, there are currently no effective methods to separate carbon nanotubes on a bulk scale by length, diameter, chirality, or a combination thereof.

Various methods have been developed to debundle carbon nanotubes in solution. For example, carbon nanotubes may be shortened by oxidative means and then dispersed as individual nanotubes in solution. Carbon nanotubes may also be dispersed in solution as individuals by sonication in the presence of a surfactant. Illustrative surfactants used for dispersing carbon nanotubes in solution include, for example, sodium dodecyl sulfate and PLURONICS. In some instances, solutions of individualized carbon nanotubes may be prepared from polymer-wrapped carbon nanotubes. Individualized single-wall carbon nanotube solutions have also been prepared using polysaccharides, polypeptides, water-soluble polymers, nucleic acids, DNA, polynucleotides, polyimides, and polyvinylpyrrolidone.

A number of uses for carbon nanotubes have been proposed including, for example, energy storage devices (e.g., ultracapacitors, supercapacitors and batteries), field emitters, conductive films, conductive wires and membrane filters. Use of carbon nanotubes as a reinforcing agent in polymer composites is another area in which carbon nanotubes are predicted to have significant utility. However, utilization of carbon nanotubes in these applications has been hampered due to the general inability to reliably produce individualized carbon nanotubes. For example, load transfer to carbon nanotubes in polymer composites is typically less than would be expected than if the carbon nanotubes were fully exfoliated as individual nanotubes.

Likewise, in applications involving electrical conduction, conductivity is lower than anticipated due to reduced access to the carbon nanotube's surface when the carbon nanotubes are agglomerated as opposed to being dispersed as individuals. Furthermore, when mixtures of conducting and non-conducting or semiconducting carbon nanotubes (i.e., carbon nanotubes having a mixture of chiralities) are used in applications involving electrical conduction, conductivity is less than could be achieved were all the carbon nanotubes electrical conductors. As noted above, current methods for producing exfoliated carbon nanotubes usually results in shortening or functionalization of the nanotubes. Such shortening or functionalization also generally results in reduced conductivity, which is also disadvantageous for applications where high electrical conductivity is beneficial.

In view of the foregoing, solid exfoliated carbon nanotubes and methods for efficiently exfoliating carbon nanotubes without nanotube damage are of considerable interest in the art. Such exfoliated carbon nanotubes are likely to exhibit considerably improved properties in applications including, for example, energy storage devices and polymer composites. Further separation of the exfoliated carbon nanotubes by chirality, length, diameter, or a combination thereof would also be of considerable interest in the art to further take advantage of their properties.

SUMMARY

In various embodiments, compositions of exfoliated carbon nanotubes are disclosed herein. The exfoliated carbon nanotubes are dispersed in the solid state such as, for example, a mat of dispersed carbon nanotubes. The exfoliated carbon nanotubes are maintained in an exfoliated state without being dispersed in a continuous matrix such as, for example, a polymer matrix dispersant or a solution.

In other various embodiments, methods for preparing exfoliated carbon nanotubes are disclosed herein.

In some embodiments, the methods for preparing exfoliated carbon nanotubes include suspending carbon nanotubes in a solution containing a first quantity of a nanocrystalline material, precipitating a first quantity of exfoliated carbon nanotubes from the solution and isolating the first quantity of exfoliated carbon nanotubes.

In some embodiments, the methods for preparing exfoliated carbon nanotubes include suspending carbon nanotubes in a solution containing hydroxyapatite, precipitating exfoliated carbon nanotubes from the solution and isolating the exfoliated carbon nanotubes.

In some embodiments, the methods for preparing exfoliated carbon nanotubes include suspending carbon nanotubes in a solution containing a nanorod material, precipitating exfoliated carbon nanotubes from the solution and isolating the exfoliated carbon nanotubes.

In some embodiments, the methods for preparing exfoliated carbon nanotubes include preparing a solution of carbon nanotubes in an acid and filtering the solution through a filter to collect exfoliated carbon nanotubes on the filter.

In still other various embodiments, energy storage devices containing exfoliated carbon nanotubes are disclosed herein. In some embodiments, the energy storage device is a battery containing at least two electrodes and an electrolyte in contact with the at least two electrodes. At least one of the electrodes contains exfoliated carbon nanotubes.

In yet additional various embodiments, methods for making a polymer composite are disclosed herein. The methods include a) providing exfoliated carbon nanotubes and b) mixing the exfoliated carbon nanotubes in a polymer material to form a polymer composite. The exfoliated carbon nanotubes remain in an exfoliated state after being mixed in the polymer material.

The foregoing has outlined rather broadly various features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 5 shows an illustrative electron micrograph of hydroxyapatite nanorods having lengths of 100-200 nm;

FIG. 6A shows an illustrative electron micrograph of as-received multi-wall carbon nanotubes; FIG. 6B shows an illustrative electron micrograph of multi-wall carbon nanotubes exfoliated using hydroxyapatite nanorods;

FIG. 7A shows an illustrative EDX spectrum of precipitated exfoliated, multi-wall carbon nanotubes; FIG. 7B shows an illustrative EDX spectrum of precipitated, exfoliated multi-wall carbon nanotubes after acid washing;

FIG. 8 shows an illustrative electron micrograph of exfoliated multi-wall carbon nanotubes after precipitation and washing;

DETAILED DESCRIPTION

Figure 1:
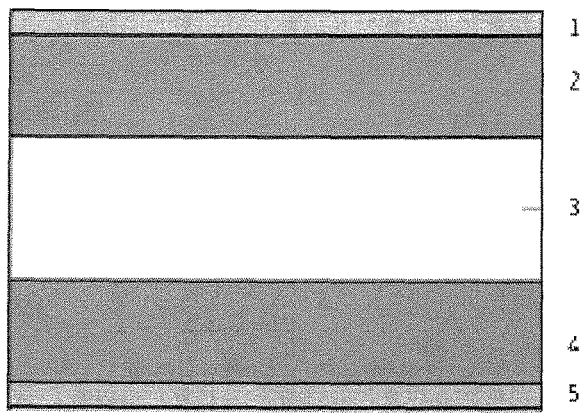
FIG. 1 shows an illustrative arrangement of the basic elements of a Faradaic capacitor.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

Various embodiments presented hereinbelow reference carbon nanotubes. In particular, in various embodiments, bundled carbon nanotubes can be debundled according to the methods described herein to produce exfoliated carbon nanotube solids. The carbon nanotubes being debundled can be made from any known means such as, for example, chemical vapor deposition, laser ablation, and high pressure carbon monoxide synthesis (HiPco). The bundled carbon nanotubes can be present in a variety of forms including, for example, soot, powder, fibers, and bucky paper. Furthermore, the bundled carbon nanotubes may be of any length, diameter, or chirality. Carbon nanotubes may be metallic, semi-metallic, semi-conducting or non-metallic based on their chirality and number of walls. In various embodiments, the bundled and/or exfoliated carbon nanotubes may include, for example, single-wall carbon nanotubes (SWNTs), double-wall carbon nanotubes (DWNTs), multi-wall carbon nanotubes (MWNTs), shortened carbon nanotubes, oxidized carbon nanotubes, functionalized carbon nanotubes, and combinations thereof. One of ordinary skill in the art will recognize that many of the specific embodiments referenced hereinbelow utilizing a particular type of carbon nanotube may practiced equivalently within the spirit and scope of the disclosure utilizing other types of carbon nanotubes.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before being exfoliated. In other embodiments, the carbon nanotubes are functionalized after being exfoliated.

In some embodiments, the carbon nanotubes may be further associated or functionalized with an electroactive material. In some embodiments, an electroactive material may be transition metals or oxides of transition metals such as, for example, Ru, Ir, W, Mo, Mn, Ni and Co. In some embodiments, the electroactive material may be a conducting polymer such as, for example, polyaniline, polyvinylpyrrole or polyacetylene. In some embodiments, the electroactive material may be a nanoparticle or plurality of nanoparticles bound to the carbon nanotubes. For example, in some embodiments, an electroactive nanoparticle may include materials such as $SnO_2$, $Li_4Ti_5O_{12}$, silicon nanotubes, silicon nanoparticles and various combinations thereof. Carbon nanotubes associated or functionalized with an electroactive material may be particularly advantageous for applications involving electrical conductivity.

Any of the embodiments herein referencing carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure. In various embodiments, the nanotubes may include elements such as, for example, carbon, silicon, boron and nitrogen. In further embodiments, the inorganic or mineral nanotubes may also include metallic and non-metallic elements. For example, in some embodiments, the inorganic or mineral nanotubes can be associated with metals, organic compounds, and inorganic compounds. Association may be on the interior or exterior of the inorganic or mineral nanotubes. Exterior association may be a physical association, such as, for example, van der Waals association. Exterior association of these materials may also include either ionic or covalent bonding to the nanotube exterior.

In various embodiments, the present disclosure describes compositions containing exfoliated carbon nanotubes. The exfoliated carbon nanotubes are not dispersed in a continuous matrix that maintains the carbon nanotubes in an exfoliated state. Illustrative continuous matrices include, for example, a solution or a polymer matrix that maintains the carbon nanotubes in at least a partially or substantially exfoliated state. In various embodiments, the exfoliated carbon nanotubes comprise a carbon nanotube mat. As such, the exfoliated carbon nanotubes of the present disclosure are distinguished over exfoliated carbon nanotubes presently known in the art, which may re-agglomerate once removed from solution.

The exfoliated carbon nanotubes of the present disclosure take advantage of physical properties offered by individual carbon nanotubes that are not apparent when the carbon nanotubes are aggregated into bundles. For example, in various embodiments, the exfoliated carbon nanotubes may be advantageously used in a wide range of applications including capacitors, batteries, photovoltaics, sensors, membranes, static dissipators, electromagnetic shields, video displays, pharmaceuticals and medical devices, polymer composites and gas storage vessels. In various embodiments, the exfoliated carbon nanotubes may also be used in fabrication and assembly techniques including, for example, ink-jet printing, spraying, coating, melt extruding, thermoforming, blow-molding and injection molding.

In various embodiments, the exfoliated carbon nanotubes may be single-wall carbon nanotubes, double-wall carbon nanotubes, multi-wall carbon nanotubes and various combinations thereof. In some embodiments, the carbon nanotubes are full-length carbon nanotubes. That is, in embodiments having full-length carbon nanotubes, the exfoliated carbon nanotubes are about the same length as the as-grown carbon nanotubes from which they are produced, and the carbon nanotube ends are generally closed in certain various embodiments. However, in other various embodiments, the carbon nanotubes are full-length carbon nanotubes that have open ends.

In some embodiments, the carbon nanotubes are substantially free of catalytic residues, non-nanotube carbon and various combinations thereof. In some embodiments, the carbon nanotubes are purified to remove catalytic residues and non-nanotube carbon. Such purification may take place either before or after the exfoliation of the carbon nanotubes takes place.

In some embodiments, the exfoliated carbon nanotubes are selectively precipitated by diameter. In various embodiments, exfoliated carbon nanotubes generally have a diameter of between about 0.7 nm and about 20 nm. Single-wall carbon nanotubes are generally about 0.7 nm to about 10 nm in diameter, whereas multi-wall nanotubes are generally greater than about 10 nm in diameter and up to about 100 nm in diameter in some embodiments. In some embodiments, the exfoliated carbon nanotubes have a diameter between about 1 nm and about 10 nm. In some embodiments, the exfoliated carbon nanotubes have a diameter between about 10 nm and about 100 nm.

In some embodiments, the exfoliated carbon nanotubes are selectively precipitated by length. The carbon nanotube length varies between about 500 nm and about 10 mm in some embodiments, between about 500 nm and 1 mm in some embodiments, between about 500 nm and 500 µm in some embodiments, between about 500 nm and 1 µm in some embodiments and various subranges thereof. In some embodiments, the exfoliated carbon nanotubes have an average length that is not substantially different than that of the bundled carbon nanotubes from which they are produced. That is, in some embodiments, the carbon nanotubes are full length carbon nanotubes that are not shortened during exfoliation. In some embodiments, the exfoliated carbon nanotubes are prepared from bundled carbon nanotubes, and the exfoliated carbon nanotubes have a narrower distribution of lengths than do the bundled carbon nanotubes. That is, a subrange of exfoliated carbon nanotube lengths may be obtained from a population of bundled carbon nanotubes having a distribution of lengths.

The carbon nanotubes have a length to diameter ratio (aspect ratio) of least about 100 in some embodiments and at least about 1000 in other embodiments. In some embodiments, the exfoliated carbon nanotubes are prepared from bundled carbon nanotubes, and the exfoliated carbon nanotubes have a narrower distribution of diameters than do the bundled carbon nanotubes. That is, a subrange of exfoliated carbon nanotube diameters may be obtained from a population of bundled carbon nanotubes having a distribution of diameters.

In various embodiments, the exfoliated carbon nanotubes are further separated by chirality. For example, in the process of exfoliating bundled carbon nanotubes, exfoliated carbon nanotubes of a specific chirality or range of chiral forms may be produced. For example, in some embodiments, the exfoliated carbon nanotubes produced may be metallic, semi-metallic or semiconducting.

In some embodiments, the exfoliated carbon nanotubes are further functionalized. Functionalization may take place either before or after exfoliation. However, Applicants envision that functionalization after exfoliation may be advantageous to take advantage of the greater surface area available in the exfoliated carbon nanotubes compared to their bundled counterparts. In some embodiments, the exfoliated carbon nanotubes are functionalized to include an electroactive material bound to the carbon nanotubes, as set forth in more detail hereinabove.

Methods for exfoliating carbon nanotubes are also described herein. In some embodiments, the methods for preparing exfoliated carbon nanotubes include suspending carbon nanotubes in a solution containing a first quantity of a nanocrystalline material, precipitating a first quantity of exfoliated carbon nanotubes from the solution and isolating the first quantity of exfoliated carbon nanotubes.

In some embodiments, the methods for preparing exfoliated carbon nanotubes include suspending carbon nanotubes in a solution containing hydroxyapatite, precipitating exfoliated carbon nanotubes from the solution and isolating the exfoliated carbon nanotubes.

In some embodiments, the methods for preparing exfoliated carbon nanotubes include suspending carbon nanotubes in a solution containing a nanorod material, precipitating exfoliated carbon nanotubes from the solution and isolating the exfoliated carbon nanotubes.

In some embodiments of the methods, the carbon nanotubes may be further oriented in an alignment step after isolating the exfoliated carbon nanotubes. In some embodiments, the exfoliated carbon nanotubes may be shaped into a form such as, for example, a mat, film, fiber, cloth, non-woven fabric or felt.

An illustrative process for exfoliating carbon nanotubes follows. Carbon nanotubes can be effectively exfoliated using nanoplates of zirconium phosphate treated with a surfactant such as, for example, tetrabutylammonium hydroxide. The carbon nanotubes and the nanoplates are sonicated for short times to obtain full exfoliation of the carbon nanotubes in aqueous media. By controlling the ionic strength of the mixture after sonication, exfoliated carbon nanotubes can be obtained by simple separation techniques such as, for example, centrifugation. The carbon nanotubes after centrifuging and separating exist in a disordered but non-aggregated state and can easily be resuspended with other surfactant addition. Suitable surfactants for resuspension include, for example, both ionic and non-ionic surfactants, such as, for example, polyvinyl pyrrolidone, sodium dodecyl sulfate and PLURONICS. Cationic surfactants may be used for dispersion in non-polar media, such as chloroform and toluene. Application of an electric potential to the suspension may be used alternatively to or in combination with adjusting the ionic strength.

Although the above process may be used to cleanly separate single-wall carbon nanotubes, multi-wall carbon nanotubes and particularly oxidized multi-wall carbon nanotubes may not be separated as cleanly due to their broader range of ionic potentials. As a result, it is difficult to achieve separation of zirconium phosphate from the exfoliated carbon nanotubes when multi-wall carbon nanotubes are used. Furthermore, zirconium phosphate is particularly difficult to dissolve in acids (solubility=0.12 mg/L in 6 M HCl), and it cannot typically be removed by simple acid washing even after isolating the exfoliated carbon nanotubes. However, other various embodiments of the present disclosure are particularly applicable for exfoliating multi-wall carbon nanotubes.

In various embodiments, the methods for preparing exfoliated carbon nanotubes further include utilizing a solution that contains both a surfactant and a quantity of a nanocrystalline material. Surfactants are well known in the carbon nanotube art to aid in solubilization. Without being bound by theory or mechanism, Applicants believe that when a surfactant is used in preparing exfoliated carbon nanotubes, the surfactant may aid in the initial solubilization or suspension of the carbon nanotubes. Precipitation of exfoliated carbon nanotubes takes place thereafter. In various embodiments of the present disclosure, the surfactant may include, for example, sodium dodecyl sulfate, sodium dodecylbenzene sulfonate, or tetralkylammonium hydroxide (e.g., tetrabutylammonium hydroxide). In some embodiments, the surfactant may also modify the surface of the nanocrystalline material used for exfoliating the carbon nanotubes.

In general, exfoliated carbon nanotubes are prepared according to some embodiments of the present disclosure by precipitating exfoliated carbon nanotubes from a solution containing a nanocrystalline material. In some embodiments, the ionic strength of the solution is adjusted to induce precipitation of exfoliated carbon nanotubes. In some embodiments, the electrical potential of the solution is adjusted to induce precipitation of exfoliated carbon nanotubes. In some embodiments, the pH of the solution is adjusted to induce precipitation of exfoliated carbon nanotubes. In some embodiments, a combination of ionic strength, electrical potential and/or pH is adjusted to induce precipitation of exfoliated carbon nanotubes.

In some embodiments, the methods for exfoliating carbon nanotubes include adding a release species to the carbon nanotube suspension to adjust the ionic strength and precipitate exfoliated carbon nanotubes. In some embodiments, the ionic strength can be adjusted with an ionic species such as, for example, a solution of KCl. Although one of ordinary skill in the art will recognize the benefits of using an ionic species for adjustment of ionic strength, non-ionic species such as organic compounds may be used for ionic strength adjustment as well. Release species may be organic or inorganic compounds. In some embodiments, an electromagnetic field can be applied to the suspension of exfoliated carbon nanotubes in lieu of or in combination with adjustment of the ionic strength with a release species to induce precipitation of the exfoliated carbon nanotubes.

After precipitation, exfoliated carbon nanotubes can be isolated by simple separation techniques such as, for example, centrifuging, filtering or settling. The separated, exfoliated carbon nanotubes exist in a disordered but non-aggregated state and can be easily redispersed in various media such as, for example, a liquid or polymer melt. In some embodiments, the redispersion may be aided by addition of a surfactant. Suitable surfactants include, but are not limited, to both ionic and non-ionic surfactants, sodium dodecyl sulfate, sodium dodecylbenezene sulfonate, and PLURONICS. Cationic surfactants are chiefly used for dispersion in non-polar media, such as, for example, chloroform and toluene. As noted above, other types of molecules such as, for example, cyclodextrins, polysaccharides, polypeptides, water soluble polymers, DNA, nucleic acids, polynucleotides, and polymers such as polyimides and polyvinyl pyrrolidone, can be used to redisperse the exfoliated carbon nanotubes in some embodiments.

In some embodiments, a second quantity of exfoliated carbon nanotubes may be precipitated from the suspension of carbon nanotubes. For example, in an embodiment, adding a second quantity of nanocrystalline material to the suspension results in precipitation of a second quantity of exfoliated carbon nanotubes. In some embodiments, the first quantity of carbon nanotubes and the second quantity of carbon nanotubes have different properties from one another such as, for example, different average lengths, diameters or chiralities. Repeated precipitation of carbon nanotube fractions may be repeated as many times as desired.

In some embodiments, the methods further include removing residual nanocrystalline material from the exfoliated carbon nanotubes. In some embodiments, the carbon nanotubes remain exfoliated after removing the nanocrystalline material. Hence, once the carbon nanotubes become fully exfoliated, they are no longer prone to becoming bundled. In some embodiments, the nanocrystalline material may be removed by washing the exfoliated carbon nanotubes. In some embodiments, the carbon nanotubes may be washed with an acid to remove the nanocrystalline material.

The redispersability of the carbon nanotubes after removal of the nanocrystalline material may be controlled by changing the surfactant concentration and the rate of addition of the release species. Hence, the redispersibility may be controlled by changing the rate of precipitation of exfoliated carbon nanotubes. In other words, in some embodiments the kinetic rate of carbon nanotube precipitation influences the rate of their redissolution following removal of the nanocrystalline material.

In general, the nanocrystalline materials of the present disclosure include any amorphous or crystalline material of nanometer-scale dimensions. In general, according to embodiments of the present disclosure, a nanocrystalline material is of nanometer-scale dimensions if it has at least one measured dimension that is less than about 1000 nm. In various embodiments of the present disclosure, carbon nanotubes are exfoliated from bundles of carbon nanotubes using a nanocrystalline material having a crystalline form such as, for example, nanorods, nanoplates, or nanowhiskers, to intersperse between individual carbon nanotubes. Nanorods include any inorganic or organic compound that may be induced to crystallize in a rod-like crystalline form. Nanowhiskers include any inorganic or organic compound that may be induced to crystallize in a whisker-like crystalline form. In various embodiments, the nanocrystalline material may include, for example, clays, graphite, inorganic crystalline materials, organic crystalline materials and various combinations thereof.

In some embodiments, the methods for preparing exfoliated carbon nanotubes include suspending carbon nanotubes in a solution containing hydroxyapatite, precipitating exfoliated carbon nanotubes from the solution and isolating the exfoliated carbon nanotubes.

In various embodiments, the nanocrystalline material may be, for example, hydroxyapatite and hydroxyapatite derivatives. Hydroxyapaptite derivatives include, for example, fluorapatite. In some embodiments, the hydroxyapatite has a crystalline form such as, for example, nanorods, nanoplates and nanowhiskers. In some embodiments, the methods further include removing the hydroxyapatite from the exfoliated carbon nanotubes. In some embodiments, removing can be accomplished, for example, through washing the exfoliated carbon nanotubes with an acid after their being isolated.

Various sizes of the nanocrystalline material may be used to exfoliate the carbon nanotubes. In some embodiments, the nanocrystalline material may be equal to or larger in size than the longest carbon nanotube present in the sample before exfoliation. In such embodiments, the exfoliated carbon nanotubes can be obtained in discrete fractions following addition of a release species such as, for example, KCl. In other embodiments, the nanocrystalline material has a size that is equal to or less than the longest carbon nanotube present in the sample before exfoliation. In this case, carbon nanotubes equal to or less than the size of the nanocrystalline material may be separated from the carbon nanotube suspension. In various embodiments, larger or smaller sizes of nanocrystalline material can be added to the carbon nanotube suspension to exfoliate carbon nanotube fractions having various carbon nanotube sizes.

In various embodiments, the exfoliated carbon nanotubes are further purified to remove impurities such as, for example, residual metal catalyst and non-nanotube carbon residue. With exfoliated carbon nanotubes, further purification is more easily conducted than like purifications conducted on bundled carbon nanotubes due to the comparatively greater surface area present in the exfoliated carbon nanotubes. Purification techniques include conventional techniques such as, for example, oxidation at elevated temperature (e.g., about 200° C. to about 400° C.) or acid extraction to remove metallic impurities. Illustrative acids that may be used to extract metallic impurities from the exfoliated carbon nanotubes include, for example, various concentrations of hydrochloric, hydrobromic, nitric, chlorosulfonic and phosphoric acids and various combinations thereof. In general, the acid and impurities are removed from the exfoliated carbon nanotubes by rinsing with water, organic solvents or combinations thereof. In some embodiments, supercritical fluids such as, for example, highly compressed $CO_2$ or hydrocarbons such as, for example, propane or butane, may also be employed to remove impurities from the exfoliated carbon nanotubes.

In various embodiments, the methods for producing exfoliated carbon nanotubes further include derivatization of the exfoliated carbon nanotubes with at least one functional group. Derivatization may occur either before or after exfoliation has occurred. Numerous methods to derivatize carbon nanotubes are known to those of ordinary skill in the art. For example, diazonium chemistry can be utilized to introduce alkyl or aryl groups, either of which may bear further functionalization, on to the carbon nanotubes. In additional embodiments, treating nanotubes with lithium in liquid ammonia, followed by reaction with an alkyl halide may be used to alkylate carbon nanotubes. Reaction of fluorinated carbon nanotubes with ammonia or amines in the presence of a catalyst such as, for example, pyridine, may be used to functionalize the nanotubes through amine-bearing functionalities. Likewise, fluorinated carbon nanotubes may be functionalized with hydroxyl-containing moieties, which may be functionalized to bear an ether linkage OR, wherein R may be any combination of alkyl, aryl, acyl, and arylacyl groups. Furthermore, R may be further functionalized, for example, with halogens, thiols, amino groups and other common organic functionalities. In addition, the carbon nanotubes may be directly functionalized with thiols, alkyl substituted thiols, aryl substituted thiols, and halogens.

In some embodiments, the first quantity or second quantity of exfoliated carbon nanotubes are selectively precipitated by a physical property such as, for example, chirality, diameter or length. In various embodiments, carbon nanotubes are exfoliated using a nanocrystalline material in the form of nanoplates and then further separated by chirality, nanotube length, or nanotube diameter. In various embodiments, carbon nanotubes are exfoliated using a nanocrystalline material in the form of nanorods and then further separated by chirality, nanotube length, or nanotube diameter. In various embodiments, carbon nanotubes are exfoliated using a nanocrystalline material in the form of nanowhiskers and then further separated by chirality, nanotube length, or nanotube diameter. Regardless of how the exfoliated carbon nanotubes are prepared, separation by chirality, length or diameter may be more facile in some instances after the carbon nanotubes are exfoliated.

In some embodiments, a direct separation of carbon nanotubes by chirality, length or diameter may be accomplished by choice of the nanocrystalline material in combination with additional agents. For example, using a nanocrystalline material either alone or in combination with chiral surfactants and/or polymers may allow exfoliated carbon nanotubes to be separated based on length, diameter, chirality, type, and functionality such as, for example, oxidation state and/or defect structure.

In some embodiments, the suspension of carbon nanotubes further includes a chiral agent, resulting in selective precipitation of exfoliated carbon nanotubes by chirality. Chiral agents include, for example, surfactants, polymers and combinations thereof. Chiral agents include molecules such as, for example, R,R-tartaric acid, which has been useful for separation of enantiomeric drugs in electrokinetic chromatography, and enantiomers of polylactic acid. Other molecules which are conventionally used in chiral separations also lie within the spirit and scope of the present disclosure. In some embodiments, the chiral agents may be used to separate exfoliated carbon nanotubes of a single chirality or a limited number of chiral configurations from a mixture of carbon nanotubes containing a range of carbon nanotube chiralities. In some embodiments, the chiral agent may be a surfactant that both helps disperse the carbon nanotubes and facilitates the chiral separation. The chiral agent may be associated with or chemically bound to the carbon nanotube surface. In some embodiments, carbon nanotubes separated by chirality also are separated by electronic type (i.e., metallic, semi-metallic and semiconducting).

By using polymers and/or surfactants having a defined chirality, separated populations of exfoliated metallic, semi-metallic, or semi-conducting carbon nanotubes can be obtained in some embodiments of the present disclosure. Without being bound by mechanism or theory, Applicants believe that polymers and/or surfactants of defined chirality preferentially wrap a carbon nanotube of a complementary chirality type. By selective carbon nanotube precipitation as described hereinabove, carbon nanotubes may be selectively separated by chirality. Selective carbon nanotube precipitation may occur either in the presence or absence of a nanocrystalline material. In some embodiments, separation techniques such as, for example, solvent/non-solvent addition, co-surfactant addition, and differential temperature gradients may be used to selectively precipitate a chiral population of carbon nanotubes.

In various embodiments, chiral polymers and/or surfactants may be mixtures of tactic molecules. By using tactic polymers with a low thermal degradation temperature, isolated, exfoliated carbon nanotubes can be easily recovered by thermal degradation of the polymer. Illustrative tactic polymers include, for example, atactic polystyrene, iostactic polystyrene, syndiotactic polystyrene, d and l polylactic acid, d and l polypropylene carbonate and the like. For example, polypropylene carbonate can be thermally degraded at less than about 300° C. without damaging carbon nanotubes. In further embodiments, the tactic molecules may be a mixture dissolved in a hydrocarbon solvent such as, for example, toluene or decalin. In still further embodiments, the carbon nanotubes in the polymers can be oriented or aligned by various methods known to those of ordinary skill in the art.

The technique of separating carbon nanotubes by chirality by using a chiral polymer may be further extended to a chromatography column for continuous separation. For example, carbon nanotubes wrapped in a chiral polymer may be applied to a chromatography column and then be separated by chirality. Alternatively, a suspension of exfoliated carbon nanotubes lacking a chiral agent may be applied to a chromatography column having a chiral stationary phase. In these alternative embodiments, separation by chirality is based on a selective interaction of the chiral stationary phase with the various carbon nanotube chiralities.

In still further embodiments, exfoliated carbon nanotubes either with or without a wrapping of chiral polymers and/or surfactants may be separated by electronic type by applying an electric potential to a solution of exfoliated carbon nanotubes. For example, exfoliated metallic carbon nanotubes will migrate toward the potential for collection and separation.

In some embodiments of the present disclosure, alternative methods for producing exfoliated carbon nanotubes not utilizing a nanocrystalline material are disclosed. In some embodiments, the methods for producing exfoliated carbon nanotubes include preparing a solution of carbon nanotubes in an acid and filtering the solution through a filter to collect exfoliated carbon nanotubes on the filter. In some embodiments, the acid is sulfuric acid. In some embodiments, the acid is a mixture of nitric acid and sulfuric acid. In some embodiments, the acid is a superacid. In some embodiments, the superacid is chlorosulfonic acid.

In general, the acid solutions used in preparing dispersed carbon nanotubes have a concentration of carbon nanotubes that is below the percolation threshold of carbon nanotubes in the acid. Filtration of such acid solutions of exfoliated carbon nanotubes produces a mat of exfoliated carbon nanotubes on the filter in various embodiments of the present disclosure. Although some acids and superacids are known to dissolve and exfoliate bundles of carbon nanotubes in solution, particularly when a liquid crystalline phase is formed, Applicants believe that there has been no recognition in the art the exfoliation can be maintained upon removal of the acid solvent. The mat of exfoliated carbon nanotubes may be further modified on the filter in some embodiments of the present disclosure. For example, in some embodiments, the mat of exfoliated carbon nanotubes may be modified by functionalizing or treating with a surfactant to maintain the carbon nanotubes in an exfoliated state. The exfoliated carbon nanotubes may be subsequently removed from the filter. In addition, the exfoliated carbon nanotubes may be further processed according to any of the methods described hereinabove.

The exfoliated carbon nanotubes prepared by the techniques described hereinabove are typically longer than are carbon nanotubes exfoliated using existing technology. For instance, as described previously, other separation techniques often result in carbon nanotube damage and shortened carbon nanotube lengths. In certain applications, particularly those involving electrical conduction or mechanical reinforcement, shorter carbon nanotubes may not provide adequate electrical conductivity or structural integrity. For example, by having at least a portion of longer carbon nanotubes present with electrical devices such as energy storage device, a higher degree of electrical connectivity at a fixed carbon nanotube volume fraction can be achieved. Furthermore, longer carbon nanotube lengths may increase the toughness of the polymer composites over those made with shorter carbon nanotubes.

The present disclosure also relates to improved energy storage devices containing exfoliated carbon nanotubes and particularly to capacitors, supercapacitors, ultracapacitors and batteries having components containing exfoliated carbon nanotubes. The improved energy storage devices include components such as, for example, current collectors, electrodes, insulators, electrolytes and separators, each capable of containing exfoliated carbon nanotubes. In some embodiments, the improved energy storage devices have at least one of at least two electrodes containing exfoliated carbon nanotubes. The improved energy storage devices also include a dielectric medium or electrolyte, each optionally including carbon nanotubes. The improved energy storage devices have a high energy density and power density.

FIG. 1 shows an illustrative arrangement of the basic elements of a Faradaic capacitor. As shown in FIG. 1, current collectors 1 and 5 contact with electrodes 2 and 4, which are separated by dielectric 3. In an embodiment of the present disclosure, at least one of the electrodes 2 and 4 contains exfoliated carbon nanotubes. In various embodiments, current collectors 1 and 5 can be metals such as, for example, copper and other highly conductive metals. In some embodiments, the current collectors can contain conductive exfoliated carbon nanotubes. In an embodiment, the carbon nanotubes may be full length exfoliated carbon nanotubes. In some embodiments, the carbon nanotubes may be separated metallic carbon nanotubes. In various embodiments, at least one of electrodes 2 and 4 contains exfoliated carbon nanotubes.

Figure 2:
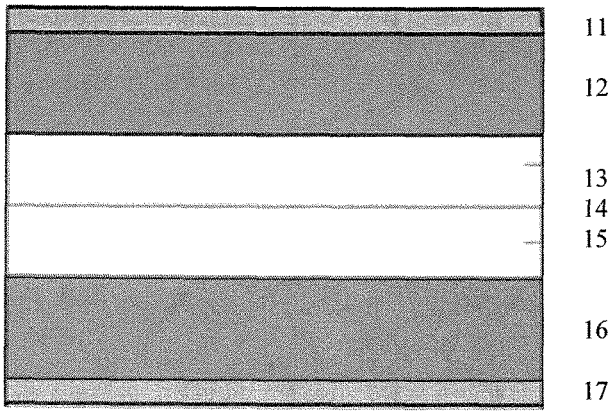
FIG. 2 shows an illustrative arrangement of the basic elements of an electric double layer capacitor.

FIG. 2 shows an illustrative arrangement of the basic elements of an electric double layer capacitor. As shown in FIG. 2, current collectors 11 and 17 contact electrodes 12 and 16, and electrolytes 13 and 15 contact electrodes 12 and 16. Non-conducting separator 14 separates electrolytes 13 and 15 and is permeable to ions flowing between the electrodes 12 and 16. In some embodiments, current collectors 11 and 17 can be metals such as, for example, copper and like conductive metals. In some embodiments, current collectors 11 and 17 contain exfoliated carbon nanotubes. In some embodiments, the carbon nanotubes may be separated metallic carbon nanotubes. In various embodiments, electrolytes 13 and 15 can contain exfoliated carbon nanotubes, which may be exfoliated conductive carbon nanotubes in some embodiments. In various embodiments, at least one of electrodes 12 and 16 contains exfoliated carbon nanotubes. Electrolytes 13 and 15 may be fully intermixed with the electrodes 12 and 16, or they may contact along a portion of the electrodes. For example electrolytes 13 and 15 may contact along a single side of electrodes 12 and 16 along a plane. In various embodiments, non-conducting separator 4 may contain non-conducting carbon nanotubes. In various embodiments, the non-conducting separator 4 may be made from porous polyethylene or fiberglass mats.

Figure 3:
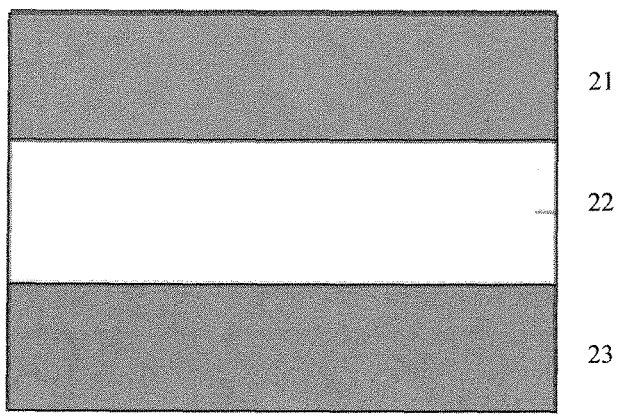
FIG. 3 shows an illustrative arrangement of the basic elements of a battery.

FIG. 3 shows an illustrative arrangement of the basic elements of a battery. As shown in FIG. 3, electrodes 21 and 23 contact electrolyte 22. The electrolyte 22 conveys ions between electrodes 21 and 23. In an embodiment, the ions are metal ions such as, for example, lithium ions. Hence, the present disclosure describes a lithium battery containing exfoliated carbon nanotubes. In some embodiments, at least one of the electrodes 21 and 23 contains exfoliated carbon nanotubes. In some embodiments, the electrolyte 22 contains exfoliated carbon nanotubes.

In various embodiments of the present disclosure, the energy storage device containing exfoliated carbon nanotubes is a battery containing at least two electrodes and an electrolyte in contact with the at least two electrodes. At least one of the electrodes contains exfoliated carbon nanotubes.

In some embodiments of the energy storage devices, the exfoliated carbon nanotubes are multi-wall carbon nanotubes. In some embodiments, the exfoliated carbon nanotubes are single-wall carbon nanotubes. In some embodiments, the at least one electrode containing exfoliated carbon nanotubes is the anode.

In various embodiments of the energy storage devices, the electrode may contain exfoliated carbon nanotubes dispersed in a polymer or viscous liquid. In various embodiments, the electrode may be laminated to another medium such as, for example, a dielectric or an electrolyte.

In various embodiments, the electrolyte of the energy storage devices can be a solid or a fluid. Electrolytes are generally chosen to minimize internal electrical resistance. Aqueous electrolytes such as potassium hydroxide or sulfuric acid are generally employed in conventional batteries and capacitors. Due to water's low electrochemical decomposition potential of 1.24 volts, the energy density is limited with these types of electrolytes. Organic electrolytes such as, for example, organic carbonates and tetraalkylammonium salts provide good solubility and reasonable conductivity. In general, organic electrolytes have lower conductivity than aqueous electrolytes, but they can operate at higher voltages, for example, up to about 5 volts. Other electrolytes can be of a polymer-gel type such as, for example, polyurethane-lithium perchlorate, polyvinyl alcohol-KOH—$H_2O$ and the related systems. Organic electrolytes such as, for example tetraethylammonium tetrafluoroborate and tetrabutylammonium tetrafluoroborate, can simultaneously serve as an electrolyte and surfactant for dispersing and exfoliating carbon nanotubes in embodiments where carbon nanotubes are contained in the electrolyte. Electrolyte salts may also be used for dispersing the carbon nanotubes or maintaining exfoliated carbon nanotubes in an exfoliated state.

In some embodiments of the energy storage devices, the exfoliated carbon nanotubes are modified with an electroactive material. In some embodiments, the electroactive material is a transition metal or transition metal oxide. Electroactive transition metals include, for example, Ru, Ir, W, Mo, Mn, Ni, and Co. In some embodiments, the electroactive material may be a conducting polymers such as, for example, polyaniline, polyacetylene and polyvinylpyrrole. In some embodiments, the electroactive material is a nanomaterial bound to the exfoliated carbon nanotubes. In some embodiments, the nanomaterial may be, for example, $SnO_2$, $Li_4Ti_5O_{12}$, silicon nanotubes, silicon nanoparticles and various combinations thereof.

In other various embodiments, the present disclosure describes layered structures containing exfoliated carbon nanotubes suitable for use in energy storage devices. For example, co-extrusion of liquids or melts containing exfoliated carbon nanotubes through multilayer dies or multilayer generators may be used in making the energy storage devices of the present disclosure. The resultant layered structures can be stacked and connected in series to give higher voltages in energy storage devices. In other embodiments, the components of the energy storage devices may be processed from a solution of exfoliated carbon nanotubes by solvent casting, spraying, paste spreading, compression stretching, or combinations thereof.

In some embodiments, the present disclosure also relates to an ion diffusion separator of electrical double-wall capacitors. In various embodiments, the separator contains non-metallic single-wall carbon nanotubes.

In some embodiments of the present disclosure, insulators of the energy storage devices contain non-metallic single-wall carbon nanotubes. In embodiments where the insulator contains carbon nanotubes, the dielectric constant of the insulator/carbon nanotube mixture may be greater than that of the insulator alone.

In various embodiments, exfoliated carbon nanotubes can be aligned in forming electrodes for use in the energy storage devices. In some embodiments, the alignment may occur through melt extrusion.

In some embodiments of the energy storage devices of the present disclosure, incorporation of exfoliated carbon nanotubes to electrodes, electrolytes or dielectrics of the energy storage devices provides enhanced strength and ruggedness to the device. These features allow further shaping of the device for functioning under demanding environments, such as high vibration or extreme thermal cycling environments.

In still additional embodiments of the present disclosure, polymer composites containing exfoliated carbon nanotubes and methods for making such polymer composites are described herein. Polymer composites of the present disclosure are advantageous over those conventionally prepared in the art by having fully exfoliated carbon nanotubes dispersed in the polymer matrix. As such, the polymer composites of the present disclosure are advantageous in having all of the carbon nanotube surface area being available for load transfer when the composite is placed under stress. Further, the exfoliated state of the carbon nanotubes allows the carbon nanotubes to be easily mixed into the polymer matrix in a non-exfoliated state, as opposed to high shear mixing techniques which are used conventionally to disperse carbon nanotubes in polymer composites.

In some embodiments, methods for making polymer composites according to the present disclosure include providing exfoliated carbon nanotubes and mixing the exfoliated carbon nanotubes in a polymer material to form a polymer composite. The carbon nanotubes remain in an exfoliated state after being mixed in the polymer material.

In some embodiments of the methods for making polymer composites, the polymer material is an epoxy. In some embodiments, the methods further include curing the epoxy.

In some embodiments, the polymer material is a monomer of a thermoplastic material, which is subsequently polymerized. In some embodiments, the polymer material is a polymer melt, which is hardened after mixing the exfoliated carbon nanotubes.

EXPERIMENTAL EXAMPLES

The following experimental examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Example 1: Exfoliation of Carbon Nanotubes Using $Zr(HPO_4)_2 \cdot H_2O$ Nanoplates and Tetrabutylammonium Hydroxide Surfactant A dispersed solution of carbon nanotubes was prepared from 10 mg of multi-wall carbon nanotubes placed in 2 mL of a solution of $Zr(HPO_4)_2 \cdot H_2O$ nanoplates and tetrabutylammonium hydroxide (5 wt % $Zr(HPO_4)_2 \cdot H_2O$; 1:0.8 ratio of $Zr(HPO_4)_2 \cdot H_2O$:tetrabutylammonium hydroxide). The solution was subsequently diluted to 30 mL and then sonicated for 2 hours. The solution was stable for at least 24 hours. An aliquot of 0.01 M KCl was added, resulting in precipitation of a quantity of exfoliated multi-wall carbon nanotubes. The precipitated fraction was removed by centrifugation. The quantity of isolated nanotubes was approximately 1/10 the mass of carbon nanotubes originally suspended. The filtrate was treated with another aliquot of 0.01 M KCl, resulting in a second precipitation of multi-wall carbon nanotubes. The precipitation/centrifugation process was repeated until substantially all nanotubes had been precipitated from the suspension.

Example 2: Exfoliation of Carbon Nanotubes Using $Zr(HPO_4)_2 \cdot H_2O$ Nanoplates of Varying Sizes (Prophetic Example)

The experimental procedure described in Example 1 hereinabove will be repeated, except with a nanoplate size of about 1/10 the length of the longest carbon nanotube present in the sample. After removal of the first precipitation fraction following addition of 0.01 M KCl, a second quantity of nanoplates of a different (larger) size will be added. The second quantity of nanoplates will fractionate a second quantity of nanotubes following addition of 0.01 M KCl. The second precipitation fraction of nanotubes may have a different length distribution than did the first precipitation fraction. The precipitation/centrifugation process will be repeated with progressively larger nanoplates until substantially all carbon nanotubes have been precipitated from the suspension.

Example 3: Synthesis of Hydroxyapatite Nanoplates

Figure 4:
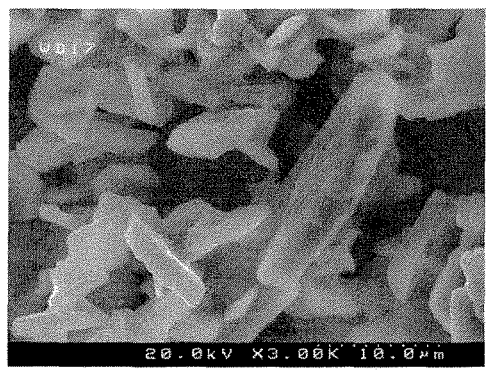
FIG. 4 shows an illustrative electron micrograph of hydroxyapatite plates having diameters of 3-15 µm.

Hydroxyapatite nanoplates of controlled sizes were synthesized by dissolving 10 g of hydroxyapatite (Sigma Aldridge reagent grade) in 400 mL of dilute nitric acid (pH=2) at room temperature, followed by very slow dropwise addition of 48 mL of 1% v/v ammonium hydroxide. Crystals collected at pH=4 and pH=5 were found by microscopy to be plates having an aspect ratio about 7 to 8 and a diameter ranging between 3-15 μm. FIG. 4 shows an illustrative electron micrograph of hydroxyapatite plates of 3-15 μm diameter. Increasing the addition rate of the 1% v/v ammonium hydroxide reduced the average plate size.

Example 4: Synthesis of Hydroxyapatite Nanorods 2 g of hydroxyapatite was first dissolved in 40 mL of dilute nitric acid (pH=2) containing a 3:1 ethanol:water ratio. The mixture was then quenched into 80 mL of 5 vol % ammonium hydroxide, also in a 3:1 ethanol:water ratio. The resultant pH was 8.5. A milky, jelly-like precipitate resulted. The resulting mixture, containing the precipitate was then heated at between 70° C. and 80° C. on a magnetic stirrer hotplate for 24 hours. Thereafter, hydroxyapatite crystals were filtered, washed with deionized water and dried. Electron microscopy showed that hydroxyapatite nanorods having an aspect ratio of about 25 and lengths between 100-200 nm were formed. FIG. 5 shows an illustrative electron micrograph of hydroxyapatite nanorods having lengths of 100-200 nm.

Example 5: Exfoliation of Carbon Nanotubes Using Hydroxyapatite 0.5142 g hydroxyapatite nanorods were added to 50 mL water and 0.8280 g tetrabutylammonium hydroxide (Sigma Aldrich reagent grade; TBAH; 1:1 molar ratio of hydroxyapatite:TBAH). The resultant mixture was sonicated for one hour at 25° C. and then diluted with deionized water to give a 0.2 wt % solution based on hydroxyapatite content.

Multi-wall carbon nanotubes were received as a powder that contained highly entangled nanotube bundles having a grain size of 1-10 μm in diameter. The lengths of the individual multi-wall carbon nanotubes were found to be in excess of 1 μm, and the diameters were found to be 10-20 nm. 1 g of the multi-wall carbon nanotubes was added to 50 mL of a mixture of concentrated sulfuric and nitric acid in a 3:1 volume ratio. The mixture was placed in a sonicator bath (Branson sonicator, model 250) and treated for two hours while sonicating at temperature of 25-35° C. The mixture was then filtered using a polyvinylidene fluoride microporous filter (5 μm pore size), followed by washing of the resultant solid with deionized water until the pH of the filtrate was 4.5. The multi-wall carbon nanotubes were then dried in vacuo for 2 hours at 80° C. The multi-wall carbon nanotubes were not substantially shortened by the acid treatment.

Samples were prepared by adding the dried multi-wall carbon nanotubes to the hydroxyapatite/TBAH solution prepared above to give carbon nanotube:hydroxyapatite weight ratios of 1:1, 1:2, 1:3, 1:4 and 1:5. The mixture was sonicated at room temperature for 2 hours and then left for 24 hours. At a weight ratio of 1:1, a portion of the multi-wall carbon nanotubes settled out as agglomerated particles. At a 1:2 weight ratio the solution had a few multi-wall carbon nanotube particles present after 24 hours. All higher weight ratios examined gave stable dispersions for at least 24 hrs. A control experiment at a weight ratio of 1:3 multi-wall carbon nanotubes:TBAH with no hydroxyapatite present showed mostly aggregated carbon nanotubes settling after 24 hours. FIG. 6A shows an illustrative electron micrograph of as-received multi-wall carbon nanotubes, and FIG. 6B shows an illustrative electron micrograph of multi-wall carbon nanotubes exfoliated using hydroxyapite nanorods.

The precipitated exfoliated multi-wall carbon nanotubes contained residual hydroxyapptite as evidenced by energy-dispersive X-ray (EDX) spectroscopy. FIG. 7A shows an illustrative EDX spectrum of precipitated exfoliated multi-wall carbon nanotubes. As shown in the EDX spectrum, strong Ca and P signals indicated the presence of hydroxyapatite. The precipitated multi-wall carbon nanotubes were subsequently washed with 50 mL of 1 N nitric acid, followed by 250 mL of deionized water, which removed substantially all the hydroxyapatite as evidenced by EDX. FIG. 7B shows an illustrative EDX spectrum of precipitated exfoliated multi-wall carbon nanotubes after acid washing. In contrast, the exfoliated multi-wall carbon nanotubes of Example 1 contained residual $Zr(HPO_4)_2 \cdot H_2O$, which could not be removed by washing with acids such as nitric, hydrochloric or sulfuric acids.

Unentangled multi-wall carbon nanotubes were obtained after exfoliation, precipitation and washing. FIG. 8 shows an illustrative electron micrograph of the exfoliated multi-wall carbon nanotubes after precipitation and washing. Exfoliation of the multi-wall carbon nanotubes could be conducted equivalently using hydroxyapatite plates.

Figure 9:
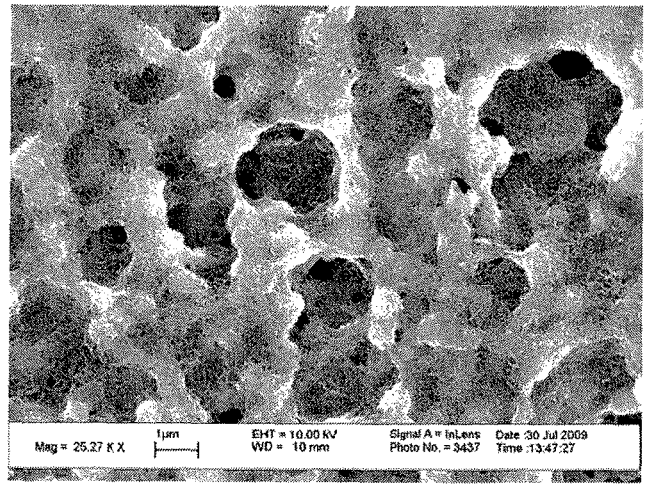
FIG. 9 shows an illustrative electron micrograph of exfoliated carbon nanotubes obtained from 3:1 $H_2SO_4:HNO_3$.

Example 6: Exfoliation of Carbon Nanotubes Using Concentrated Acid Solutions 40 mg of multi-wall carbon nanotubes were added to 40 mL of a 3:1 sulfuric:nitric acid mixture and sonicated for 60 minutes at 25° C. A drop of the mixture was placed on a PVDF filter and allowed to dry. FIG. 9 shows an illustrative electron micrograph of exfoliated carbon nanotubes obtained from 3:1 $H_2SO_4$:$HNO_3$. As shown in FIG. 9, exfoliation was maintained after removal of the acid by drying.

Figure 10:
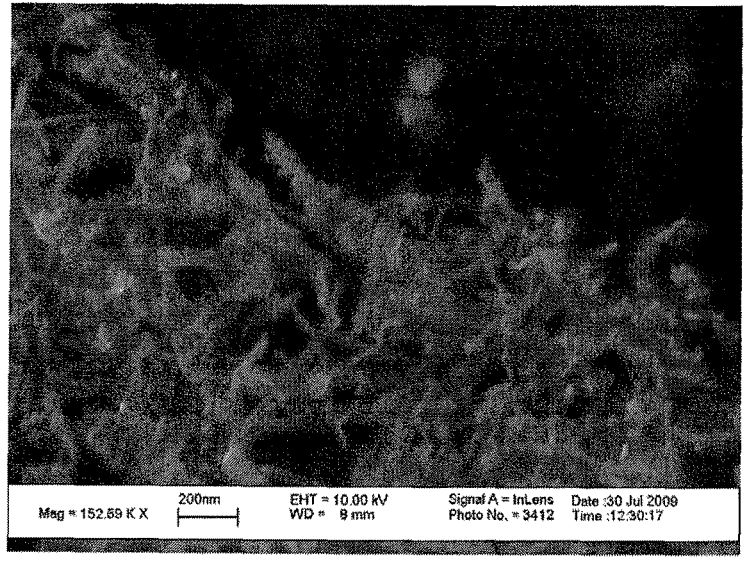
FIG. 10 shows an illustrative electron micrograph of exfoliated double-wall carbon nanotubes following acid exfoliation and treatment with sodium dodecyl sulfate.

Example 7: Exfoliation of Carbon Nanotubes Using Concentrated Acid Solutions, Followed by Surfactant Addition A 1% by weight double-wall carbon nanotube solution in 3:1 sulfuric:nitric acid was treated for 2 hours as described previously. After filtering the concentrated acid solution to immobilize the double wall carbon nanotubes, the immobilized carbon nanotubes were washed with deionized water until the washings were pH=4.5. While still wet, the PVDF filter paper and the double-wall carbon nanotubes were sonicated for 30 minutes with a 0.2% by weight sodium dodecyl sulfate (SDS) solution in deionized water such that the weight of double-wall carbon nanotubes to SDS was 1:3. The mixture was stable for at least 24 hours. A drop of the mixture was placed on a carbon tape and dried for examination by electron microscopy, which showed exfoliated carbon nanotubes. FIG. 10 shows an illustrative electron micrograph of exfoliated double-wall carbon nanotubes following acid exfoliation and treatment with sodium dodecyl sulfate.

Example 8: Epoxy Composite Containing Exfoliated Carbon Nanotubes 5 mg of acid-treated multi-wall carbon nanotubes were placed in 10 mL of tetraethylenetetramine (TETA), and various additions of sodium dodecylsulfate (SDS) were added such that the weight ratio of multi-wall carbon nanotubes to SDS was 5, 2.5, 1, and 0.33 to 1. The mixture was sonicated at 30° C. for 30 minutes and allowed to stand. After 7 days the 1:1 and 1:0.33 ratio was seen to be stable toward precipitation.

49 g of Bisphenol F epoxy was admixed with 0.242 g of acid-treated multi-wall carbon nanotubes and sonicated for 10 minutes at 60° C. The mixture was cooled to 25° C. and then degassed for 10 minutes at 25 inches Hg. 7 g of TETA containing 0.5% wt treated multi-wall carbon nanotubes and 0.5% wt. SDS was sonicated and degassed separately as above. The two degassed mixtures were then carefully mixed and poured into a mold. The mold was cured for 2 hours at 100° C. Controls were prepared as above without carbon nanotubes (control 1) and with as-received multi-wall carbon nanotubes (control 2).

Table 1 shows the mechanical strength improvement in the epoxy composite containing exfoliated multi-wall carbon nanotubes. Kq is the maximum stress before failure on tensile testing of a notched specimen at 0.01/min initial strain rate and 1 mm razor notch. Relative fatigue lifetime improvement is the lifetime of the notched specimen counted as the number of cycles to failure at 1 Hz, at about 16.7 MPa maximum tensile stress with stress amplitude of 0.1 (stress minimum/stress maximum). As shown in Table 1, significant mechanical property enhancement was observed when exfoliated carbon nanotubes were used.

TABLE 1

Mechanical Properties of Carbon Nanotube Composites

| Material | Relative Kq improvement | Relative fatigue lifetime improvement |
| --- | --- | --- |
| Control 1 | 1 | 1 |
| Control 2 | 1.2 | 1.1 |
| Exfoliated Carbon Nanotubes | 1.5 | 4.7 |

Example 8: Capacitor Containing Exfoliated Multi-Wall Carbon Nanotubes

Control 1: 10 g of poly(ethylene oxide) (PEO; 1500 molecular weight) was melted, and 1 mL of 4 N potassium hydroxide added to make the electrolyte. 1 wt % of as-received multi-wall carbon nanotubes were added to the electrolyte mixture and sonicated for 15 minutes in a sonicator bath. Approximately 2.1 g of the mixture was poured into one part of a polystyrene petri dish 6 cm in diameter with a strip of copper adhered as the current collector. A piece of clean writing paper was then placed on the molten liquid electrolyte, and 2 g of the electrolyte was poured on to the paper, taking care not to weep at the edges. The other side of the petri dish with a copper strip adhered was then inserted to make a capacitor. After cooling to room temperature for 15 minutes the capacitance was measured using an HP 4282A capacitance meter. The measured capacitance was 0.0645 microfarads. Control 2: Control 2 was prepared as for control 1, except as-received graphene (Rice University) was substituted for the multi-wall carbon nanotubes. The measured capacitance was 0.176 microfarads. Exfoliated carbon nanotube capacitor: The capacitor was prepared as for Control 1, except exfoliated multi-wall carbon nanotubes were used in place of as-received multi-wall carbon nanotubes. The measured capacitance was 0.904 microfarads, a 14-fold improvement over control 1 and a 5.1-fold improvement over control 2.

Figure 11:
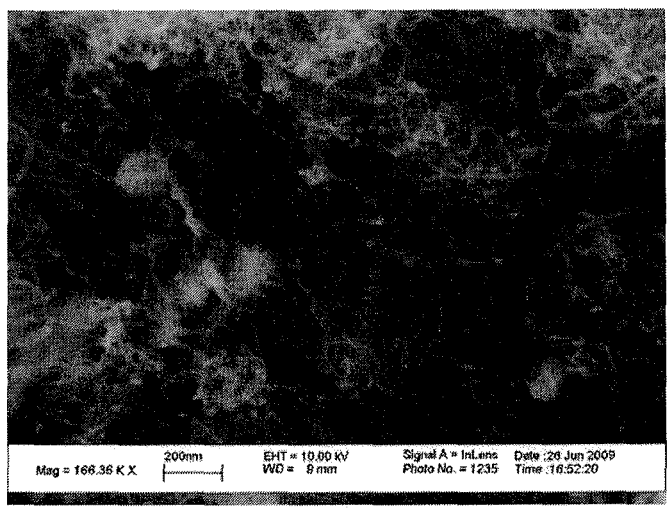
FIG. 11 shows an illustrative electron micrograph of exfoliated carbon nanotubes decorated with copper oxide nanoparticles.

Example 9: Exfoliated Carbon Nanotubes Decorated with Copper Nanoparticles 102 mg of exfoliated multi-wall carbon nanotubes were added to 100 mg copper sulfate, 640 mg sodium EDTA, 15 mg of polyethylene glycol, 568 mg of sodium sulfate and 60 mL of deionized water. The mixture was sonicated for 10 minutes and then heated to 40° C. 3 mL of formaldehyde (37% solution) and 500 mg of sodium hydroxide were added to bring the pH to 12.2. The mixture was stirred for 30 minutes at 85° C. and then filtered using a 5 micron PVDF filter and washed with 200 mL of deionized water. FIG. 11 shows an illustrative electron micrograph of exfoliated carbon nanotubes decorated with copper oxide nanoparticles obtained from the mixture.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A composition suitable for an energy storage device with enhanced conductivity, the composition comprising a plurality of discrete exfoliated oxidized multiwall carbon nanotubes substantially free of catalytic residue impurities wherein the exfoliated carbon nanotubes are functionalized to comprise an electroactive material bound to the carbon nanotubes, wherein the electroactive material is selected from the group consisting of transition metals, oxides of transition metals, conducting polymers, $SnO_2$, $LiTi_5O_{12}$, silicon nanotubes, and silicon nanoparticles wherein the composition has a higher electrical conductivity than similar compositions comprising agglomerated nanotubes.

2. The composition of claim 1, wherein the composition comprises a mat of exfoliated carbon nanotubes.

3. The composition of claim 1, wherein the carbon nanotubes are multi-wall carbon nanotubes and wherein the carbon nanotubes are full-length carbon nanotubes.

4. The composition of claim 1, wherein the exfoliated carbon nanotubes are prepared from bundled carbon nanotubes; wherein the exfoliated carbon nanotubes have a narrower distribution of lengths, and/or a narrower distribution of diameters than do the bundled carbon nanotubes.

5. The composition of claim 1, wherein the composition has a higher toughness than similar compositions comprising agglomerated nanotubes.

6. The composition of claim 1, wherein the composition transfers more load to the nanotubes when placed under stress than similar compositions comprising agglomerated nanotubes.

7. The composition of claim 1, wherein the electroactive material is bound to the nanotubes by covalent bonding or ionic bonding.

8. The composition of claim 1, wherein the electroactive material is a nanoparticle.

9. The composition of claim 1, wherein the composition is substantially free of non-nanotube carbon.

* * * * *